United States Patent [19]
Hoshino et al.

[11] Patent Number: 5,283,681
[45] Date of Patent: Feb. 1, 1994

[54] SCANNING OPTICAL EQUIPMENT

[75] Inventors: Osamu Hoshino, Ebina; Isamu Shimoda, Zama; Kazuo Isaka, Tokyo; Masayuki Suzuki, Zama, all of Japan

[73] Assignee: Canon Kabushiki Kaisha, Tokyo, Japan

[21] Appl. No.: 515,870

[22] Filed: Apr. 27, 1990

[30] Foreign Application Priority Data

Apr. 28, 1989 [JP] Japan .................. 1-111357
Aug. 4, 1989 [JP] Japan .................. 1-202383

[51] Int. Cl.$^5$ .............................. G02B 26/08
[52] U.S. Cl. ........................ 359/198; 359/212; 250/201.2
[58] Field of Search ............... 350/6.1-6.9, 350/252, 255, 247; 346/108, 160; 250/201.2, 201.4, 234-236; 359/197, 201, 205, 209-210, 212, 216-217, 223, 226, 813, 819, 822, 823

[56] References Cited

U.S. PATENT DOCUMENTS

| | | | |
|---|---|---|---|
| 4,251,825 | 2/1981 | Mikawi et al. | 346/160 |
| 4,314,154 | 2/1982 | Mimoura et al. | 250/235 |
| 4,321,700 | 3/1982 | Rusell | 359/216 |
| 4,350,988 | 9/1982 | Masegi | 350/6.6 |
| 4,834,520 | 5/1989 | Klainman | 350/6.8 |
| 4,918,306 | 4/1990 | Saito | 350/6.8 |
| 4,990,771 | 2/1991 | Mimoura et al. | 350/6.8 |
| 5,083,140 | 1/1992 | Peterson et al. | 346/160 |
| 5,095,319 | 3/1992 | Watarai et al. | 346/160 |
| 5,103,091 | 4/1992 | Hirose et al. | 346/108 |

FOREIGN PATENT DOCUMENTS

| | | | |
|---|---|---|---|
| 58-005078 | 1/1983 | Japan . | |
| 60-9243 | 3/1985 | Japan . | |
| 61-15118 | 1/1986 | Japan | 350/6.5 |
| 61-275868 | 12/1986 | Japan . | |
| 2041580 | 9/1980 | United Kingdom . | |

Primary Examiner—Scott J. Sugarman
Assistant Examiner—James Phan
Attorney, Agent, or Firm—Fitzpatrick, Cella, Harper & Scinto

[57] ABSTRACT

A scanning optical equipment provided with the means to detect scanning beam spot at more than two points of the scanned surface and the means to enable direct observation of the state of focussing of the beam spot, thus enabling extremely precise control of the state of focussing and forming an extremely high density image which could not be obtained by the conventional methods.

26 Claims, 13 Drawing Sheets

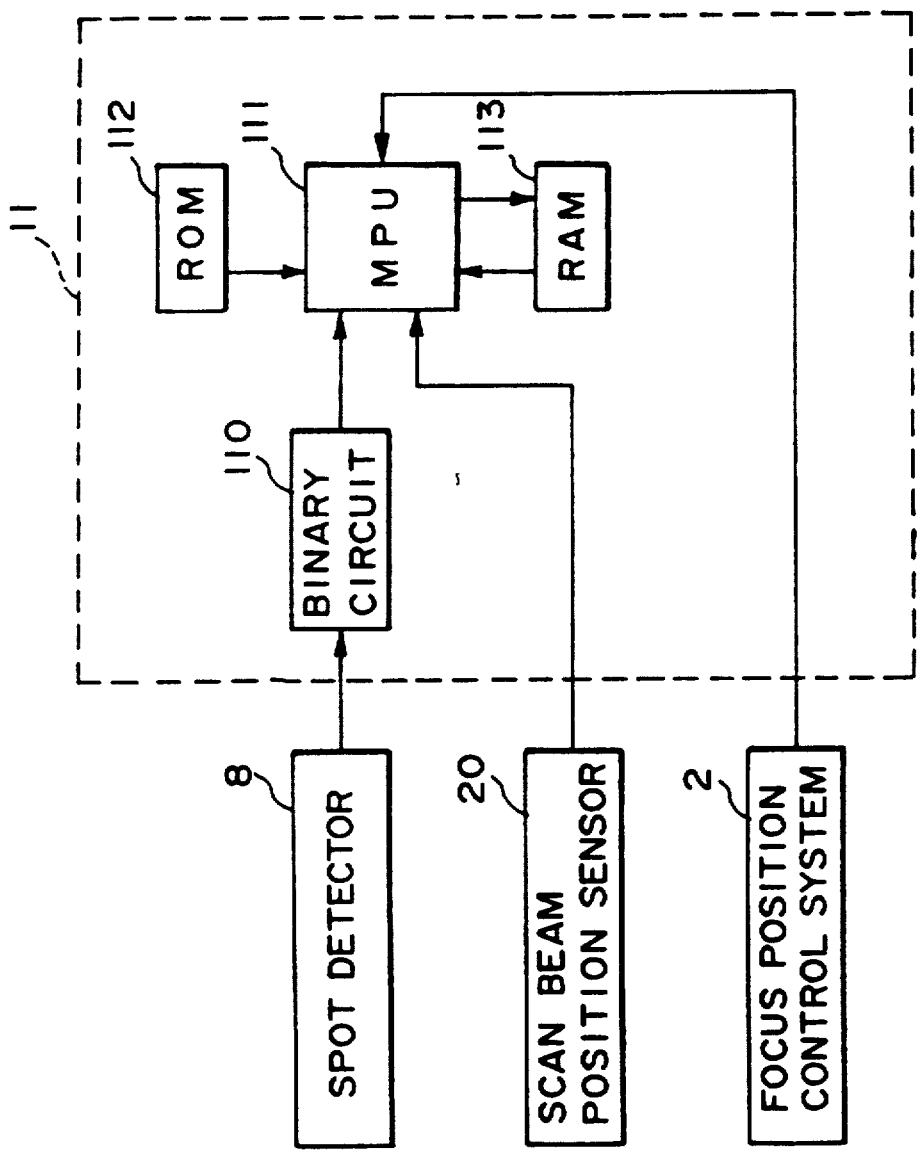
F I G. 3A

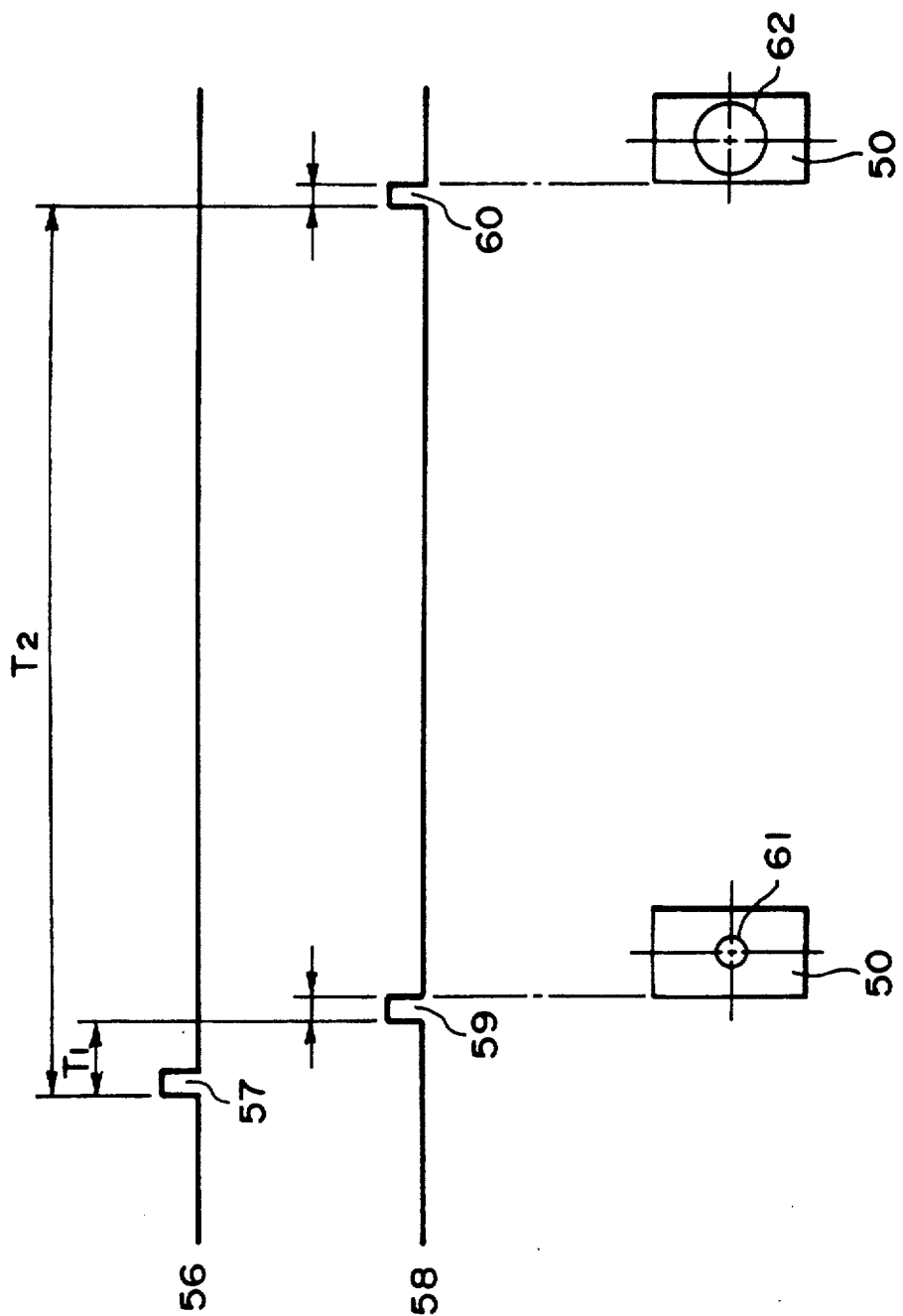
F I G. 5

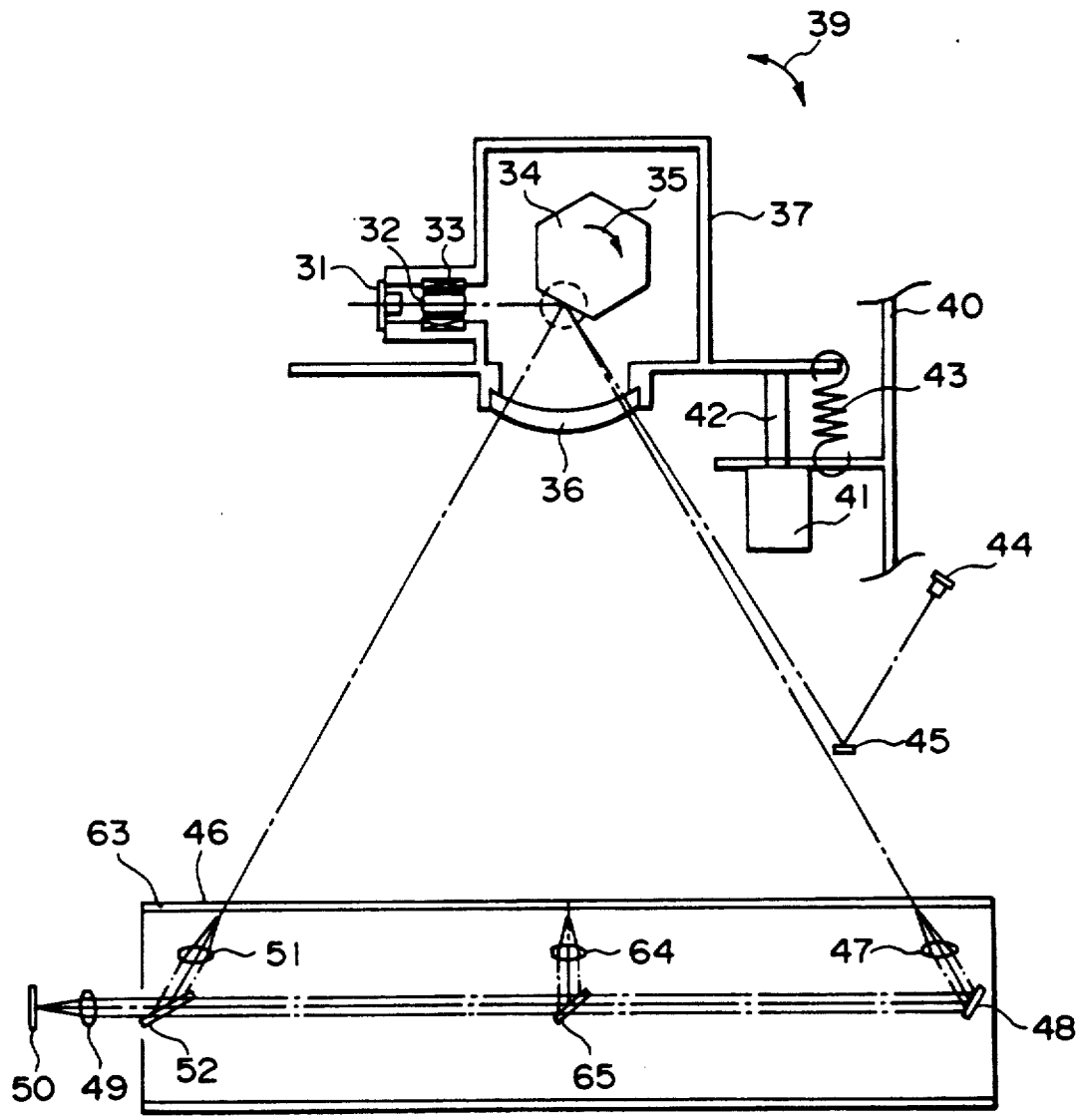
F I G. 10

SCANNING OPTICAL EQUIPMENT

BACKGROUND OF THE INVENTION

1. Field of the Invention

The present invention relates to a scanning optical equipment such as image forming equipment to scan a recording member such as photosensitive member by a flying spot coming from laser etc., particularly to a scanning optical equipment with stable spot diameter.

2. Related Background Art

With the conventional laser beam printer which employs electronic photosensitizer or silver salt photosensitizer, it has been customary that the state of formation of beam spot image on the photosensitive member is observed by guiding the beam to the photoelectric conversion device via a reflective mirror placed at a part on the line of laser scanning and based on the results of such observation, the state of formation of beam spot image on the photosensitive member is adjusted (for example, Japanese application Laid-Open No. 61-275868).

There was also a type where a reflective mirror is placed at outside the photosensitive member on the laser beam scanning line and thus the state of formation of beam spot image is observed in the same way (Japanese patent publication No. 60-9243).

However with such conventional equipments, the state of formation of beam spot image on the photosensitive member is observed not by directly detecting the beam from the photosensitive member but by what may be called an indirect mimetic method.

On the other hand, in recent years, with the rapid dissemination of desk top publishing, a higher picture quality is demanded to the laser beam recording. However according to the aforesaid conventional method, it has been known that there is certain limitation to the increase of resolution which is at around 400 dpi (dot per inch) to 600 dpi and to obtain the resolution of for example 1200 dpi or 2500 dpi responding to such demand for higher picture quality, other method of observation is believed to be necessary.

Now therefore, to solve the aforesaid problem, the objective of the present invention is to provide the scanning optical equipment which is so composed that the state of focussing of the spot on the irradiated member such as photosensitive member is directly detected.

In order to achieve the aforesaid objective, the scanning optical equipment of the present invention is provided with the spot detecting means which detects the state of focussing of the scanning beam on the scanned surface of the photosensitive member etc. by receiving the scanning beam having scanned the objective surface of photosensitive member etc. and the control means to control the state of focussing of the said scanning beam in response to the output signal emitted by the detecting means.

In the case of the aforesaid scanning optical equipment, the spot detecting means to observe the spot of the scanning beam to be focussed on the irradiated member such as photosensitive member is provided and therefore the state of focussing of the spot on the irradiated member is detected directly and with certainty and consequently such state of focussing can be precisely controlled.

BRIEF DESCRIPTION OF THE DRAWINGS

FIG. 3A is the block diagram of the control circuit and FIG. 3B is the timing chart.

FIG. 5 is the drawing to explain the data which enter into the image pick-up device.

FIG. 10 is the drawing to explain another example of embodiment of the scanning optical equipment of the present invention.

DESCRIPTION OF THE PREFERRED EMBODIMENTS

Figure 1:
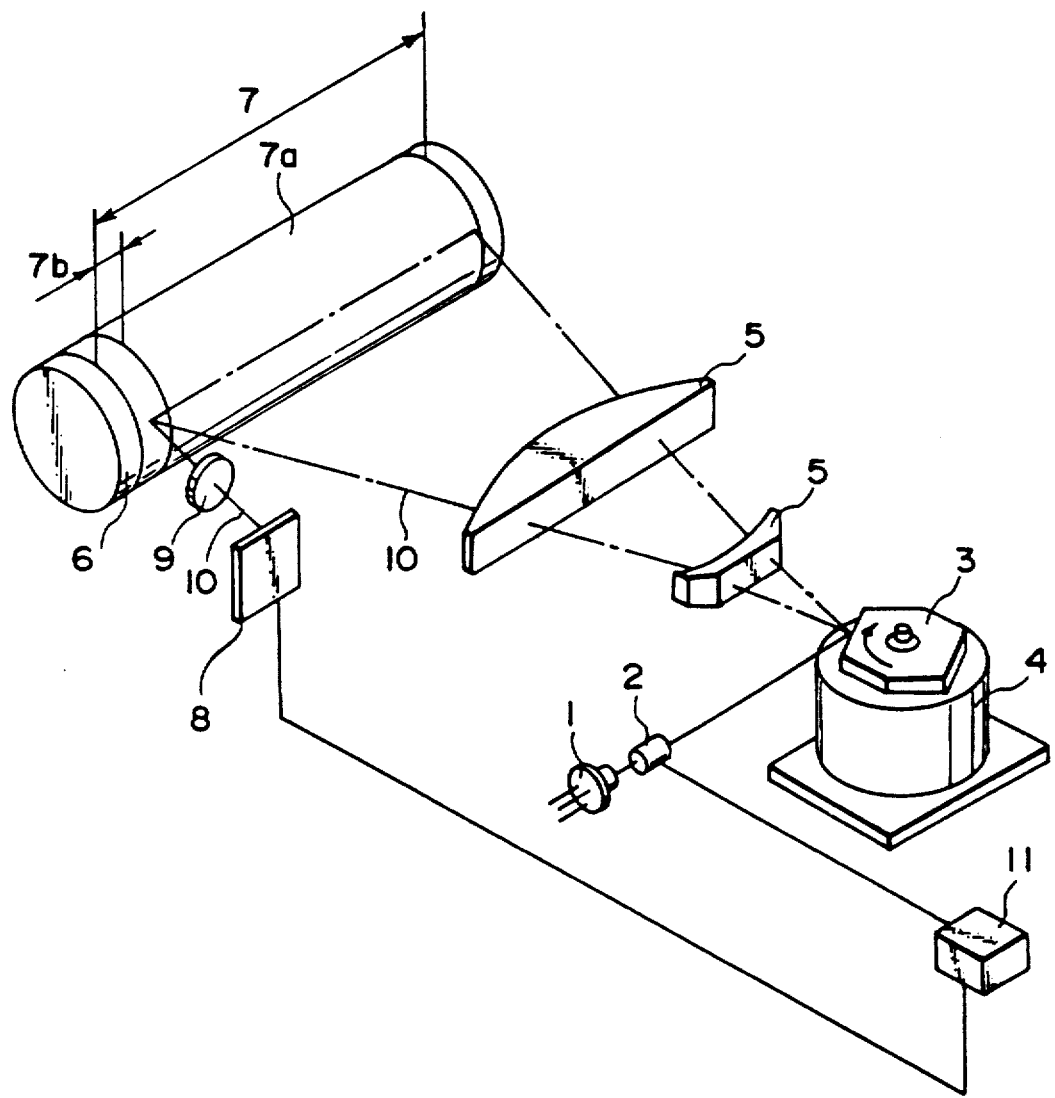
FIG. 1 is the composition drawing of an example of embodiment of scanning optical equipment of the present invention.

FIG. 1 indicates an example of embodiment of the scanning optical equipment of the present invention. In this figure, 1 is the light source such as semiconductor laser, 2 is the focussing position control system including collimator lens, 3 is the rotary polygon mirror, 4 is the driving motor of polygon mirror 3, 5 is the scanning lens system, 6 is the drum to support photosensitive layer, 7 is the sheet-formed silver salt photosensitive layer, 7b is the reflective layer provided along the periphery of sheet-formed photosensitive layer, 8 is the spot detector which employs a one dimensional image pick-up device such as CCD, MOS, etc., 9 is the image-forming lens to form the image of scanning light 10 reflected by the reflective layer 7b on the spot detector and 11 is the control circuit which generates control signal to control the focussing position controlling system 2 in response to the output signal of spot detector 8. 7a is the image forming region (region of use) on the photosensitive layer. Image forming region means the region in which image is formed by modulating the semiconductor laser, the light source, in response to the image signal. Therefore the reflective layer 7b is at outside the image forming region or region of use.

In the equipment as illustrated in FIG. 1 the scanning light 10 is reflected by the reflective layer 7b and the reflected light reaches the spot detector 8. The detector 8 detects the state of focussing of scanning light 10 and the output signal of such detector 8 is given to the control circuit 11 for calculation, measurement etc. of the state of focussing. Based on the result of such calculation and measurement, control circuit 11 emits control signal to the focussing position control system 2.

Control system 2 moves the collimator lens in the direction of the optical axis and the focussing position of the scanning light 10 moves in proportion to the amount of change of photosensitive layer 7. Of course, the control system may be the type which shifts the light source such as laser by piezoelectric device.

By repeating the detection and calculation of the state of focussing of scanning light 10 and moving of focussing position, the state of focussing of scanning light 10 on the photosensitive layer 7 can be optimized for each scan.

As illustrated in FIG. 1, the present invention relates to the scanning optical equipment to scan the irradiated member by the light beam coming from the light source via the optical system, which is characterized by being provided with the spot detecting means to detect the state of focussing of light beam on the irradiated member by receiving the light beam from the part outside the region of use on the irradiated member and the control means to control the state of focussing of the said light beam in response to the output signal of the said detecting means.

Figure 2:
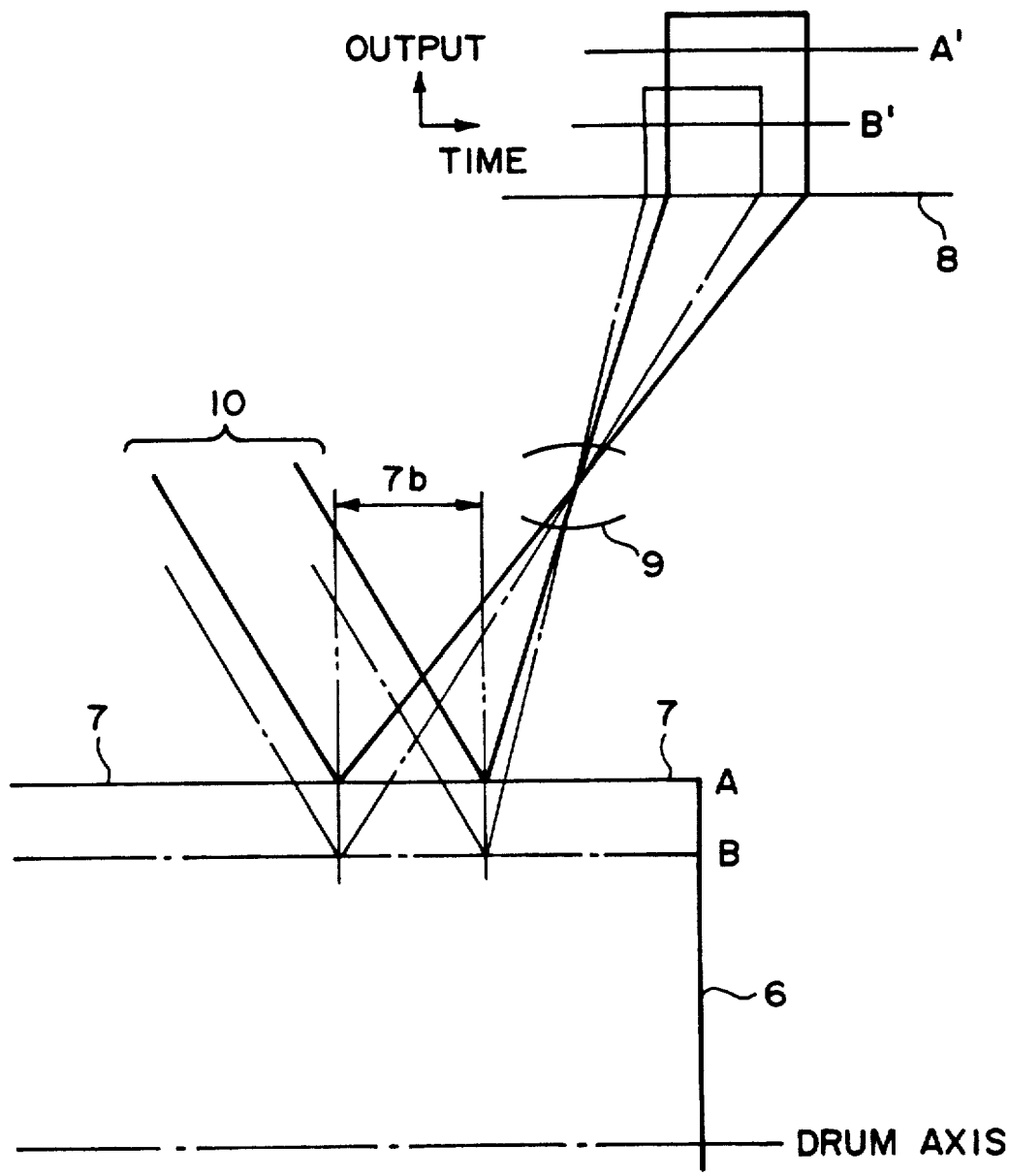
FIG. 2 is the drawing to explain the principle of such embodiment.
Figure 3B:
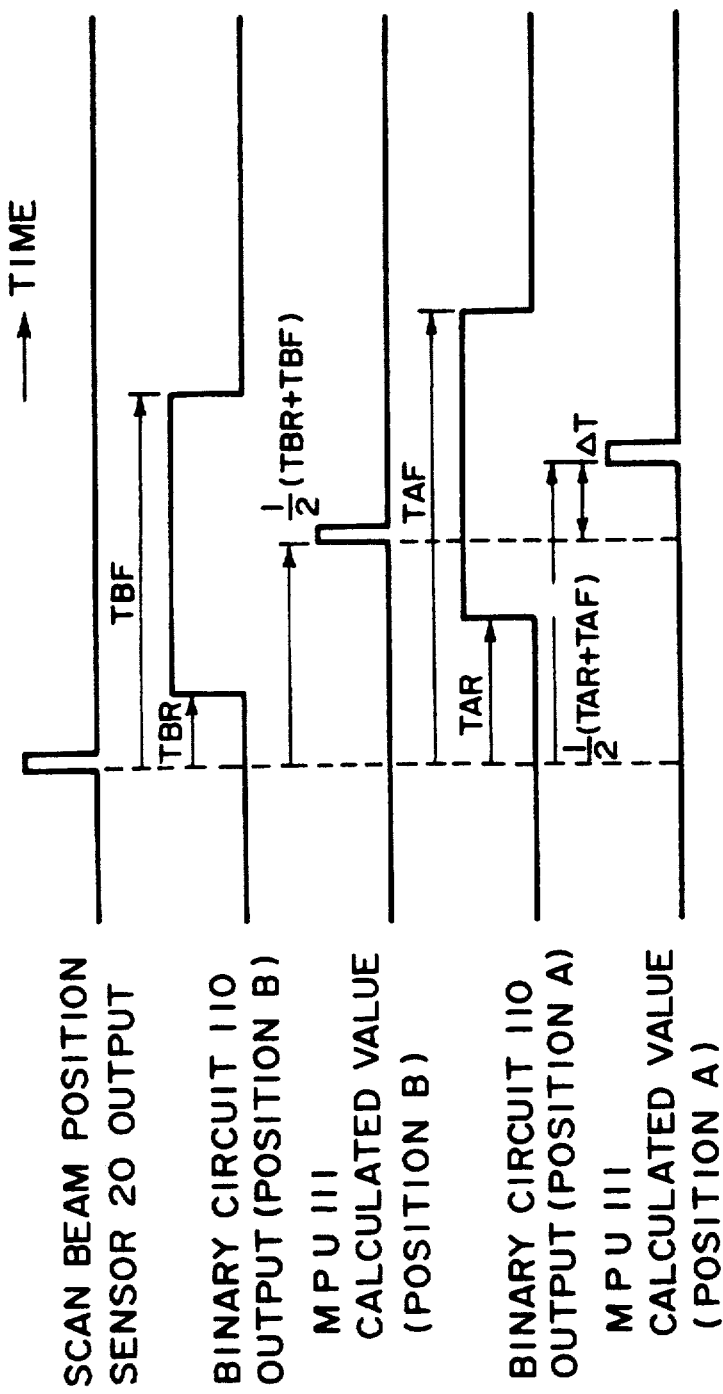

An example of processing of signal executed by the equipment illustrated in FIG. 1 shall be explained in reference to FIG. 2 and FIGS. 3A and 3B.

As shown in FIG. 2, the scanning light 10 is reflected by the reflective layer 7b and the reflected light reaches the spot detector 8 and thus its output changes whereas if the photosensitive layer 7 of the drum 6 deflects in the direction of optical axis (vertical direction in FIG. 2) or the scanning light 10 shifts in the direction of light axis due to some external disturbance, the time of generation of ιtput of spot detector 8 changes. Utilizing such phenomenon, the state of focussing of scanning light 10 on the photosensitive layer 7 is directly detected and based on such detecting signal, the said state of focussing is optimized.

Suppose the position of photosensitive layer 7 shifts in the direction of optical axis from A to B as illustrated in FIG. 2. Then the reflective layer 7b which is made into one unit with photosensitive layer 7 also changes its position in the same way and moves from position A (focussing position) to position B.

Reflective layer 7b has the higher reflective ratio than photosensitive layer 7 (it may be low but S/N ratio improves as the difference is greater) and the light reflected by reflective layer 7b is focussed on the light receiving surface of detector 8 by image forming lens 9, consequently when the position of reflective layer 7b changes from A to B as aforesaid, the output of the detector 8 also changes from A' to B' as illustrated in FIG. 2. In this case the time of generation of the output is accelerated. Thereby the deflection of photosensitive layer 7 is detected by directly receiving the scanning light.

As shown in the block diagram FIG. 3A, the output of detector 8 is input into the control circuit 11 and processed there. That is, the output of detector 8 is binarized to an appropriate level by binary circuit 110 of the control circuit 11 which is composed of binary circuit 110, MPU111, ROM112 and RAM113 and thus binarized data are input into MPU111.

Here, into MPU111 is also input the output of scan beam position sensor 20 not shown in FIG. 1 (which receives the scanning light 10 at an appropriate position and outputs beam detector signal, i.e., BD signal in order to determine the timing for position setting of the image on the photosensitive layer 7 in lustre direction) and scan beam position sensor 20 detects the scanning light 10 at the timing earlier than the detector 8 and therefore the rising and falling time of the output of spot detector 8 is measured in reference to the output of scan beam position sensor 20 used for standard.

As indicated in the timing chart of FIG. 3B, when the rising time and falling time of the output of binary circuit 110 i.e., the output of detector 8 which is based on the output of scan beam position sensor 20 at position B are named $T_{BR}$ and $T_{BF}$, the center of the time of the output of binary circuit 110 is calculated to be $(T_{BR}+T_{BF})/2$ using the contents of the memory of ROM112 and also as for the position A, it is calculated likewise to be $(T_{AR}+T_{AF})/2$ and it is memorized in RAM113.

The amount of position change $\Delta Z$ of photosensitive layer 7 is expressed by $\Delta Z = K\Delta T$ (K: proportional constant) based on $T = [(T_{AR}+T_{AF})/2 - (T_{BR}+T_{BF})/2]$ and therefore the focussing position of scanning light 10 or the state of focussing on the photosensitive layer 7 is so controlled that $\Delta Z$ which is given to the focussing position control system should become zero.

Control system 2 is the system which moves, for example, the collimator lens to the direction of optical axis and thereby the focussing position of scanning light 10 moves in proportion to the amount of deflection of photosensitive layer 7. Of course the control system may be of such type that the light source such as laser is shifted by piezoelectric device.

By repeating the detection and calculation of the state of focussing of the scanning light 10 and moving of focussing position, the state of focussing of scanning light 10 on the photosensitive layer 7 is optimized for each scan.

As aforesaid, the spot detecting means which detects the state of focussing on the irradiated member detects the timing of change of the amount of received light beam when the light beam moves between the region of use and the section out of the region of use. And in response to the output signal given by the aforesaid spot detecting means, the control means which controls the state of focussing of the said light beam controls the state of focussing of the light beam in such way that the change at the aforesaid timing of change becomes zero.

In the aforesaid embodiment, the state where the silver salt photosensitive sheet 7 is winded around the drum 6 is shown but it may be so composed that 6 is an electronic photosensitive drum, 7 is an electronic photosensitive member and 7b is a mirror reflective section.

As aforesaid, according to the present invention, the scanning beam on the irradiated member such as photosensitive member is directly observed and utilizing the detected signal, the state of focussing of the beam spot on the irradiated member is controlled and in the case of the image forming equipment containing such scanning optical equipment, a stable high resolution image is always obtained.

The scanning optical equipment of the present invention is provided with the spot detecting means which detects the state of focussing of scanning beam on the irradiated member by receiving the scanning beam coming from outside the region of use on the irradiated member such as photosensitive member (for example, the image forming region of the image forming equipment) and the control means which controls the state of focussing of the aforesaid light beam in response to the output signal coming from such detecting means.

The part outside the region of use may be so constructed that it has the reflective index appropriately different from that of the region of use so that the spot detecting means detects the timing of move of the scanning beam in between the region of use and outside of such region of use.

The control means may be so constructed that it controls the state of focussing of light beam in such way that the change of the amount of received light beam as detected by the spot detecting means when the beam moves in between the region of use and outside such region of use should become zero.

With the rapid dissemination of desk top publishing in recent years, recording with still higher accuracy such as 1200 dpi or 2500 dpi is aimed at and for such such accuracy, the spot diameter should be around 25 μm and the depth of field should be around 0.2 mm and if so, the conventional method of observation which makes observation at only one spot of the scanning line by indirect mimetic method can not rectify the disturbance of spot shape on the surface of photosensitive member caused by defocussing due to temperature and humidity, defocussing due to inclination of good image plane as against the plane of photosensitive member, curvature of field of scanning lens, etc.

In view of the above problem the still other example of practise of the present invention to be explained hereunder provides the scanning optical equipment which has the composition to materialize high precision spot by enabling the correction of focussing, correction of inclination of the good image plane as against the plane of the irradiated member, correction of spot size, etc.

With the scanning optical equipment of the present invention which attains the aforesaid objective, the irradiated member is scanned by the light beam emitted by the light source and the state of focussing of the spot of scanning light beam formed on the irradiated member is observed at least at two points and detected by the light detecting means.

Light detecting means may be one or in plural number in accordance with the number of observation points.

In response to the output signal of the detecting means, the equipment of the present invention control the focussing of the scanning light beam or flying spot and controls the posture of flying spot, i.e., the posture of good image plane by moving the scanning optical system or irradiated member forward and backward in the direction of depth.

With the scanning optical equipment of the present invention having the aforesaid composition, the spot on the irradiated member is not detected by indirect mimetic method at one point as it is done with the conventional equipment but the state of focussing of the spot on the irradiated member is directly observed at plural number of points and therefore not only the focussing of the spot is controlled but also the accurate agreement of the good image plane and the plane of irradiated member is achieved, and its resolution increases to the level beyond the conventional limit of about 400 dpi to 600 dpi enabling the adjustment of spot shape with such high accuracy as 1200 dpi or 2500 dpi.

When the observation of plural number of points is executed by one detecting means, the composition of the system may also be made simple.

Figure 4:
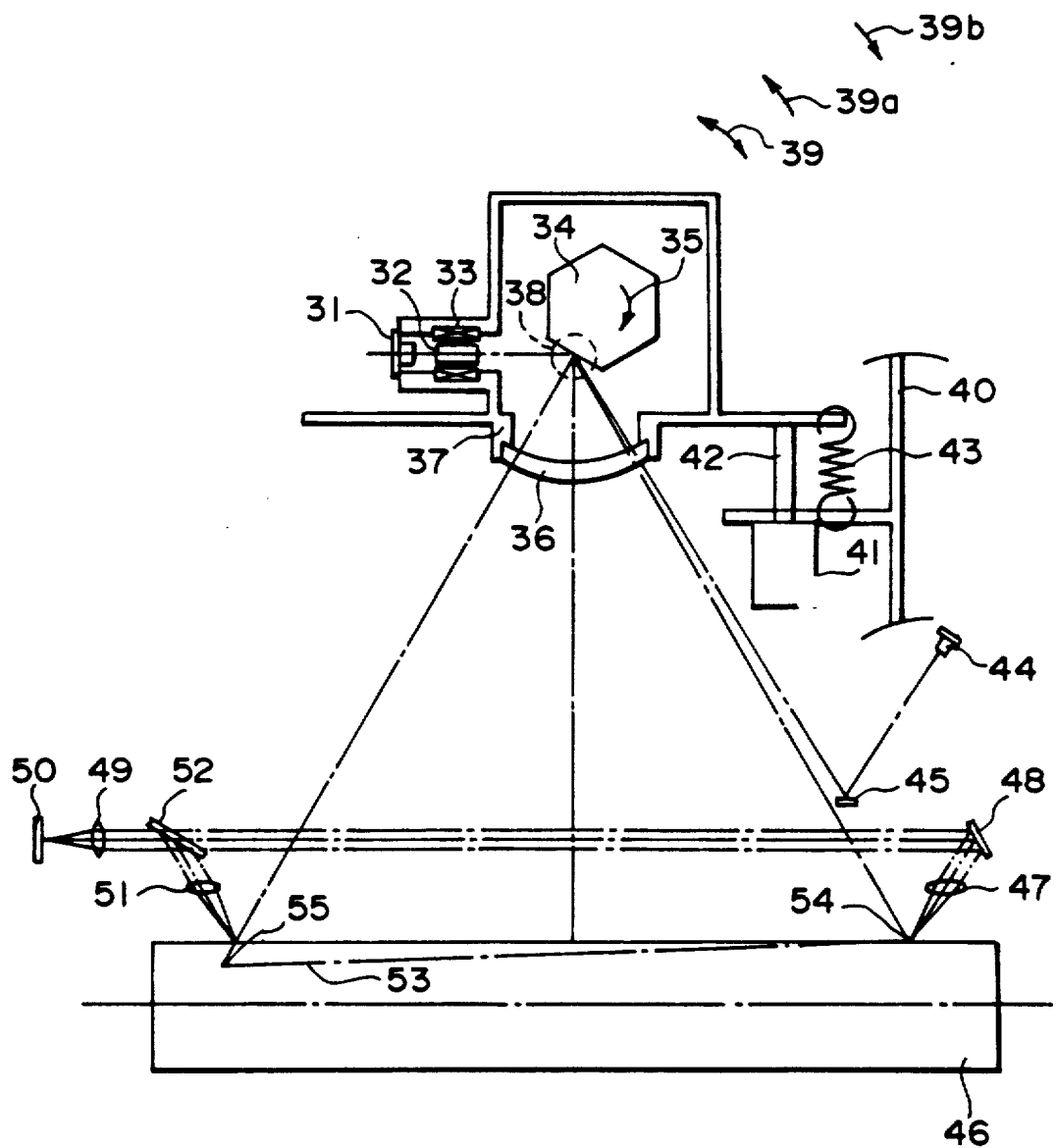
FIG. 4 is the composition drawing of the other example of embodiment of the scanning optical equipment of the present invention.

FIG. 4 shows the composition of the embodiment of the scanning optical equipment of the present invention.

In the said figure, 31 is the laser unit including semiconductor laser, 32 is the collimator lens to focus the light beam coming from laser unit 31, 33 is the actuator to move the collimator lens 32 to and fro in the direction of optical axis, 34 is the polygon mirror caused to rotation at high speed in the direction of arrow 35 by the motor not indicated in the drawing, 36 is an f·θ lens for which toric lens etc. is used upon necessity.

Here, actuator 33 may be made of diverse type of devices such as the combination of voice coil, helicoid and rotary motor, a plate spring driven by piezoelectric device or those used for the pick-up of CD player or optical pick-up of optomagnetic recording equipment etc. and the elements 31, 32, 33, 34 and 36 are fixed to the frame 37, the said frame 37 being able to revolve in the direction of arrow 39 around the rotation center 38 (deflection center of light beam by polygon mirror 34).

Further, 40 is a part of the fixed frame which makes one unit with the main body frame, 41 is the pulse motor attached to the part 40 of the frame, 42 is the shaft which moves to and fro according to the direction of rotation of pulse motor 41, the shaft 42 pressing the frame 37 in the direction of rotation 39a. 43 is a tension coil spring which pulls the frame 37 in the direction of rotation 39b while the rotation of frame 37 in the direction 39 is realized by the rotation of pulse motor 41.

44 is the beam detector composed of photodiode, 45 is the turning mirror which optically detects the starting end of a laser scan, thus determining the timing of writing of the image. 46 is the photosensitive member which is composed of an electronic photosensitive member formed in the shape of a drum or silver salt photosensitive member coiled in the shape of drum, etc.

Hereunder is explained the detecting mechanism which detects the state of focussing of the spot of scanning light beam on the photosensitive member 46.

With this detecting mechanism, the reflected light coming from the spot at the side of the starting end of image writing is collimated by lens 47, guided to image forming lens 47 by turning mirror 48 and the image of spot shape is formed on the two dimensional image forming device 50.

Further, the reflected light coming from the spot at the side of finishing end of image writing is collimated by lens 51, reflected by half mirror 52, guided to the image forming lens 49 and the image of spot shape is formed on the two dimensional image forming device 50.

Based on the aforesaid composition, the performance of the embodiment shown in FIG. 4 is explained.

In FIG. 4, the state of inclination of good image plane 53 as against the plane of photosensitive member 46 caused by temperature, humidity, variation due to elapse of time etc. is shown. At the image starting end 54, the scanning beam focusses properly and forms an accurate spot shape but at the finishing end 55 of the image, good image is formed at the point further inside of the plane of photosensitive member 46 and defocussed image is formed on the photosensitive member 46.

Under such conditions, the data entering into the image forming device 50 shall be as shown in FIG. 5. In the said figure, 56 indicates the signal entering into the beam detector 44 and in each scan, the signal 57 is detected immediately before the scanning beam reaches the image starting end 54. 58 indicates the counter &o sweep out the signal coming from the image forming device 50 and trigger 59 at the starting end of writing is determined by the delay time $T_1$ from the rising point of signal 57 of the beam detector 44.

This delay $T_1$ is unconditionally determined at the time of designing of the machine, by the position of turning mirror 45, the position of image forming lens 47 and the scanning speed.

Likewise trigger 60 at the side of finishing end of writing is determined by the delay time $T_2$ which is unconditionally determined at the time of designing of machine, by the position of turning mirror 45, position of image forming lens 51 and the scanning speed.

As aforesaid, the spot shape 61 at the starting end 54 of writing is detected by reading the signal of image forming device 50 by trigger 59 at $T_1$ time after the emission of signal 57 of beam detector 57 and the spot shape 62 at writing end 55 is detected by reading the signal of image forming device 50 by trigger 60 at $T_2$ time later than the signal 57 of beam detector 44.

As aforesaid, the preferred shape of the flying spot on the photosensitive member 46 is known beforehand and therefore it is possible to know that the spot shape 61 agrees with the preferred shape and spot shape 62 is defocussed.

From the result of such detection, it is known that the plane 53 of good image is inclined as shown in FIG. 4.

Figure 6:
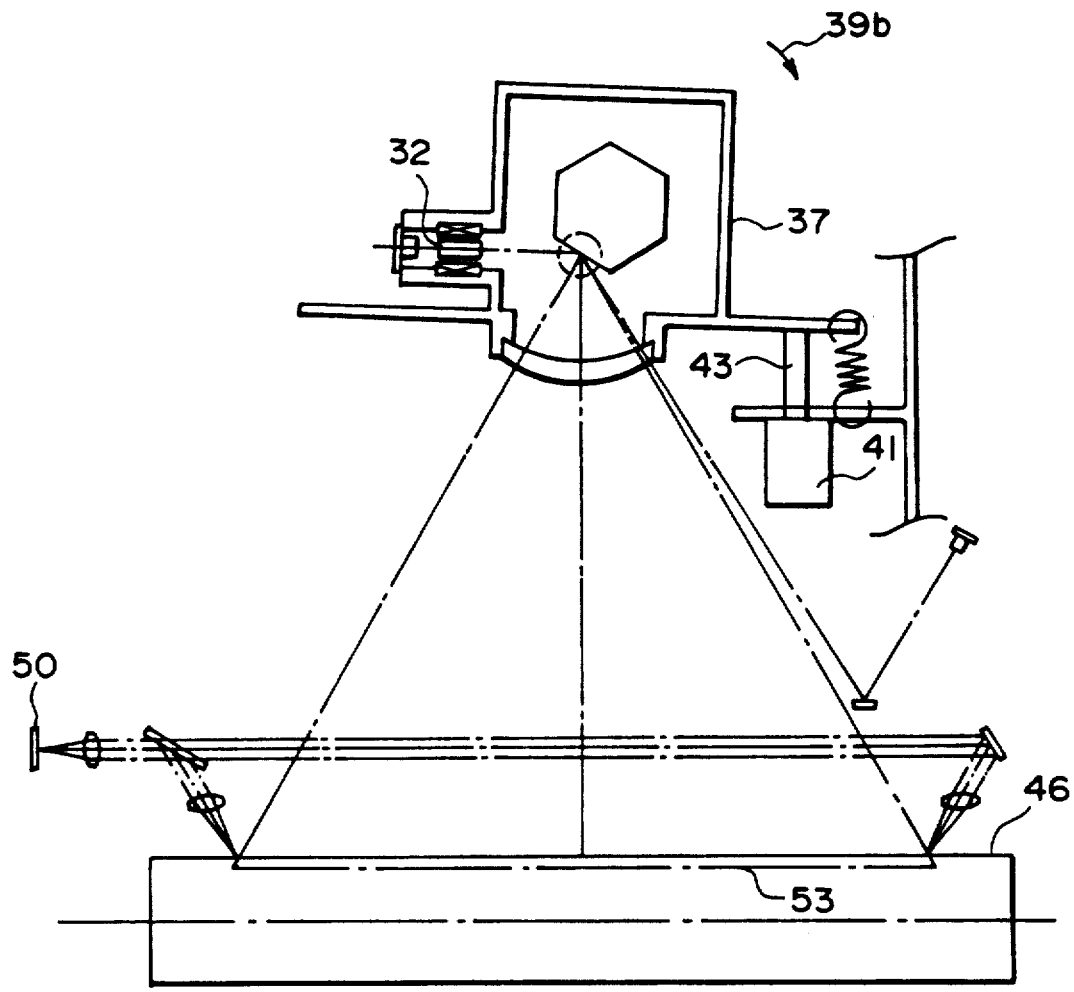
FIG. 6 is the drawing to explain the method of correction of inclination of the image plane.

Based on the results of such detection, an example of the method to correct the inclination of good image plane 53 is explained in reference to FIG. 6. In this case, by the judgement that the aforesaid inclination is corrected by revolving the frame 37, the shaft 43 of pulse motor 41 is caused to retreat and frame 37 is caused to revolve in the direction of arrow 3?' By such mechanism the good image plane 53 is made to be parallel to the plane of photosensitive member 46 as shown in FIG. 6.

Figure 7:
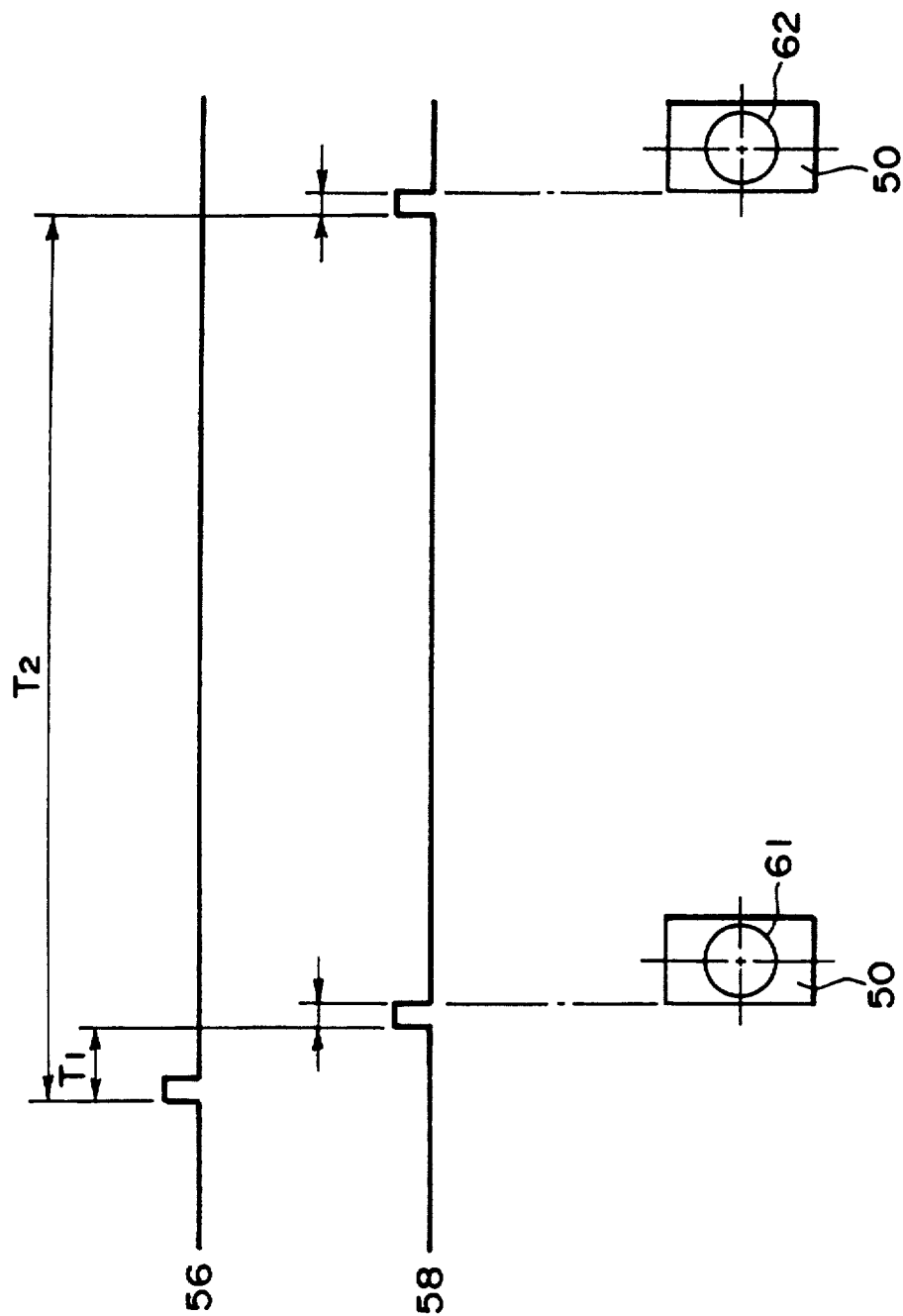
FIG. 7 is the drawing to explain the data entering into the image pick-up device after correction of inclination of image plane.

Here again the light beam is scanned and the state of focussing of the spot at such time is detected by the image forming device 50. FIG. 7 shows the data of such image forming. Here, the spot shape 61 at starting end 54 and the spot shape 62 at the finishing end 55 are both larger than the ideal shape, that is, they are defocussed but since they have the identical shape, it is known that the good image plane 53 is in parallel with the plane of photosensitive member 46.

Figure 8:
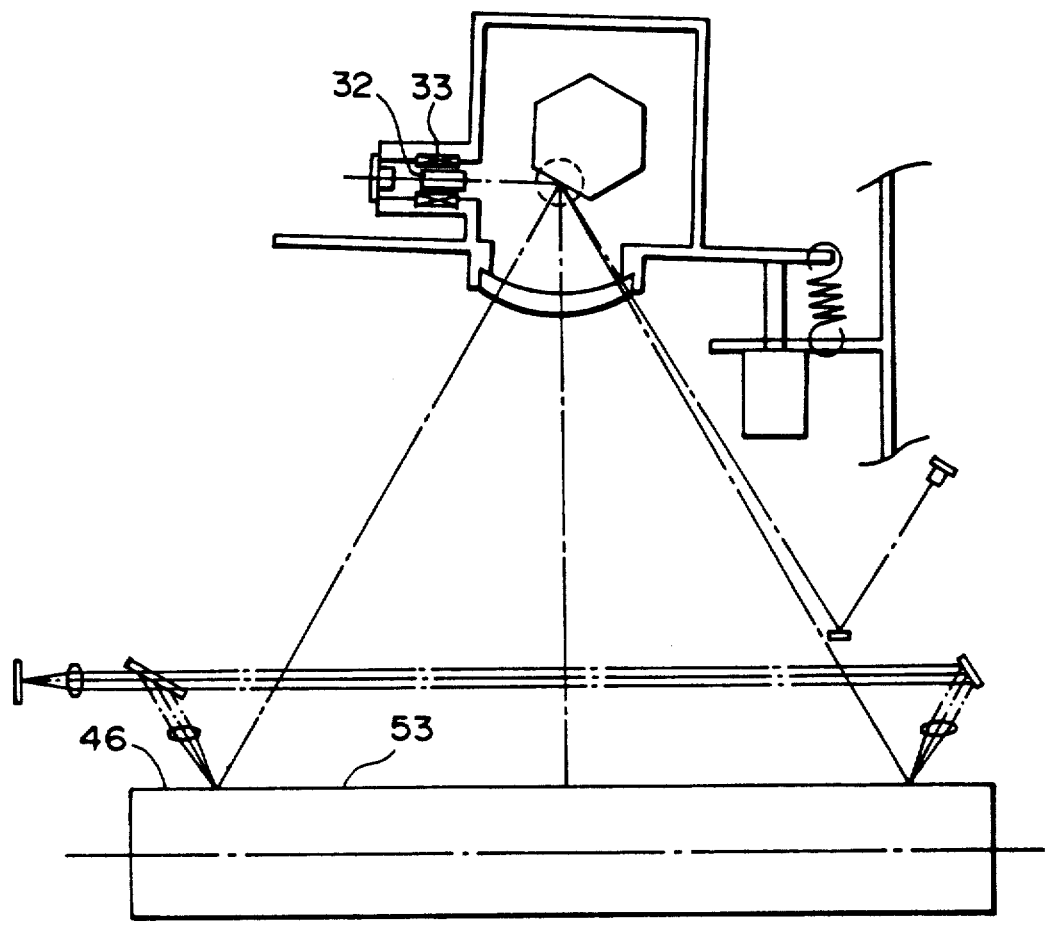
FIG. 8 is the drawing to explain the method of focussing.

Therefore it is considered to be appropriate if collimator lens 32 is moved in the direction of optical axis based on such results to realize focussing. FIG. 8 illustrates an example of such focussing method. Here the actuator 33 is made to function and collimator lens 32 is made to move to and fro based on the data of image forming device 50 and thus the good image plane 53 and the plane of photosensitive member 46 are made to agree for the entire region of scanning and the correct focussing is obtained.

Figure 9:
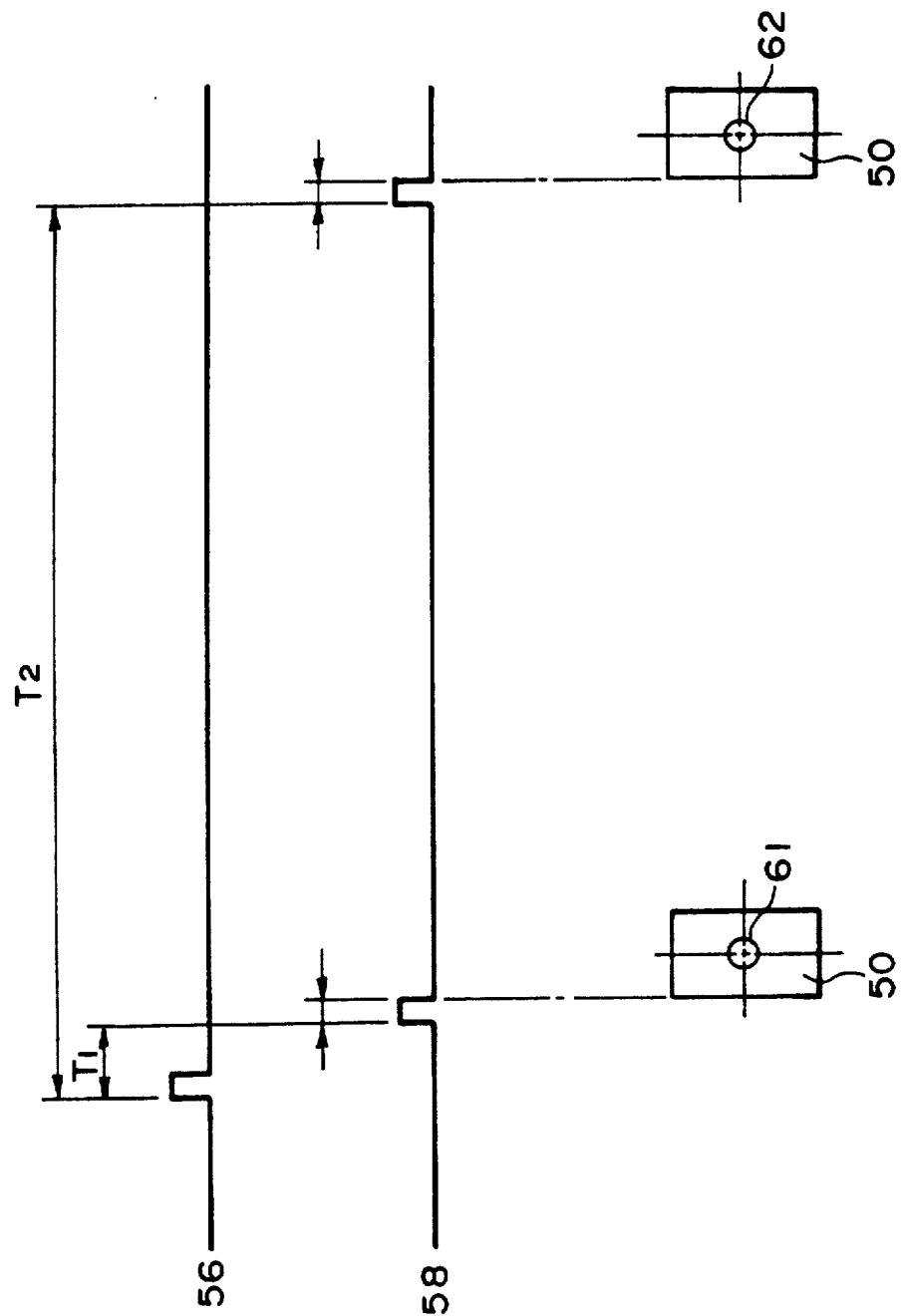
FIG. 9 is the drawing to explain the data entering into image pick-up device after focussing.

In other words correct focussing is obtained when the light beam is scanned and the state of focussing of the spot is detected by the image forming device 50 and based on the image forming data shown in FIG. 9, the collimator lens 32 is moved to and fro as shown in FIG. 8 so that the spot shape 61 at the starting end and the spot shape 62 at the finishing end shall satisfy preferred design values. For the method to realize such state of focussing, the focussing method of auto-focus camera etc. may be used.

In the case of the example as explained above, it is possible to observe the spot shape at plural number of points by one detecting means, correct the inclination of the image plane and focussing etc. and obtain the preferred spot for the entire scanning region.

FIG. 10 shows another example of embodiment. In the case of this embodiment, the supporting drum 63 of the photosensitive member 46 is composed of the transparent member such as glass and inside the supporting drum 63 are arranged collimator lens 47, turning mirror 48, image forming lens 49, image forming device 50, collimator lens 51 and half mirror 52 and by further providing the 3rd collimator lens 64 and the 3rd turning mirror (half mirror) 65, spot shape is measured at 3 points.

Figure 11:
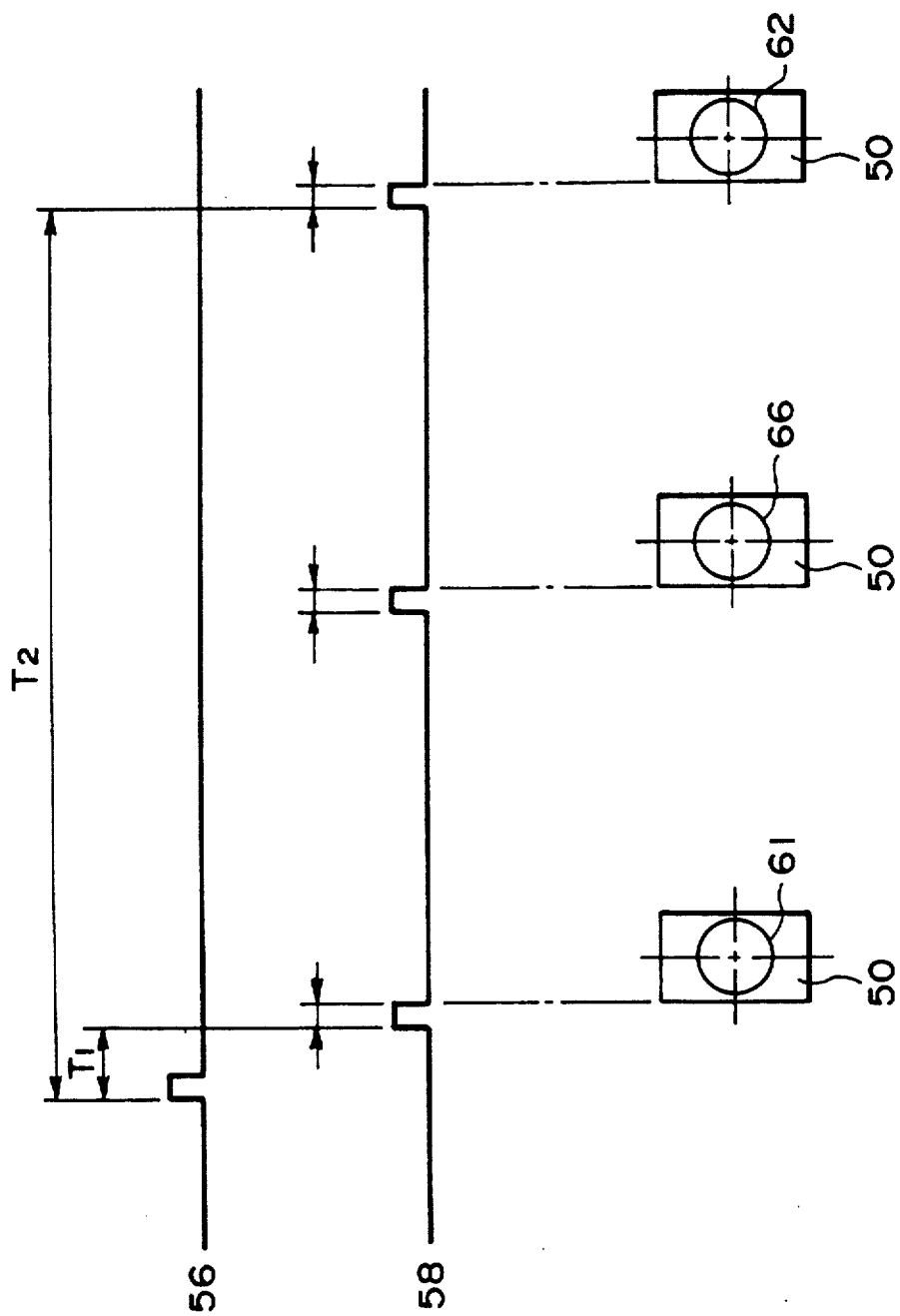
FIG. 11 is the drawing to explain the data entering into the image pick-up device in the embodiment of FIG. 7.

FIG. 11 shows the image forming data of image forming device 50. By knowing the spot shape 66 at the central part in addition to the spot shape 61 and 62 at both ends, it is possible to make correction taking into account the curvature of field and distortion based on such results of detection.

Thus it is possible to do the control of the state of focussing of the spot with higher accuracy.

Correction of the curvature of field and distortion may be made by controlling the f·θ lens, etc.

Figure 12:
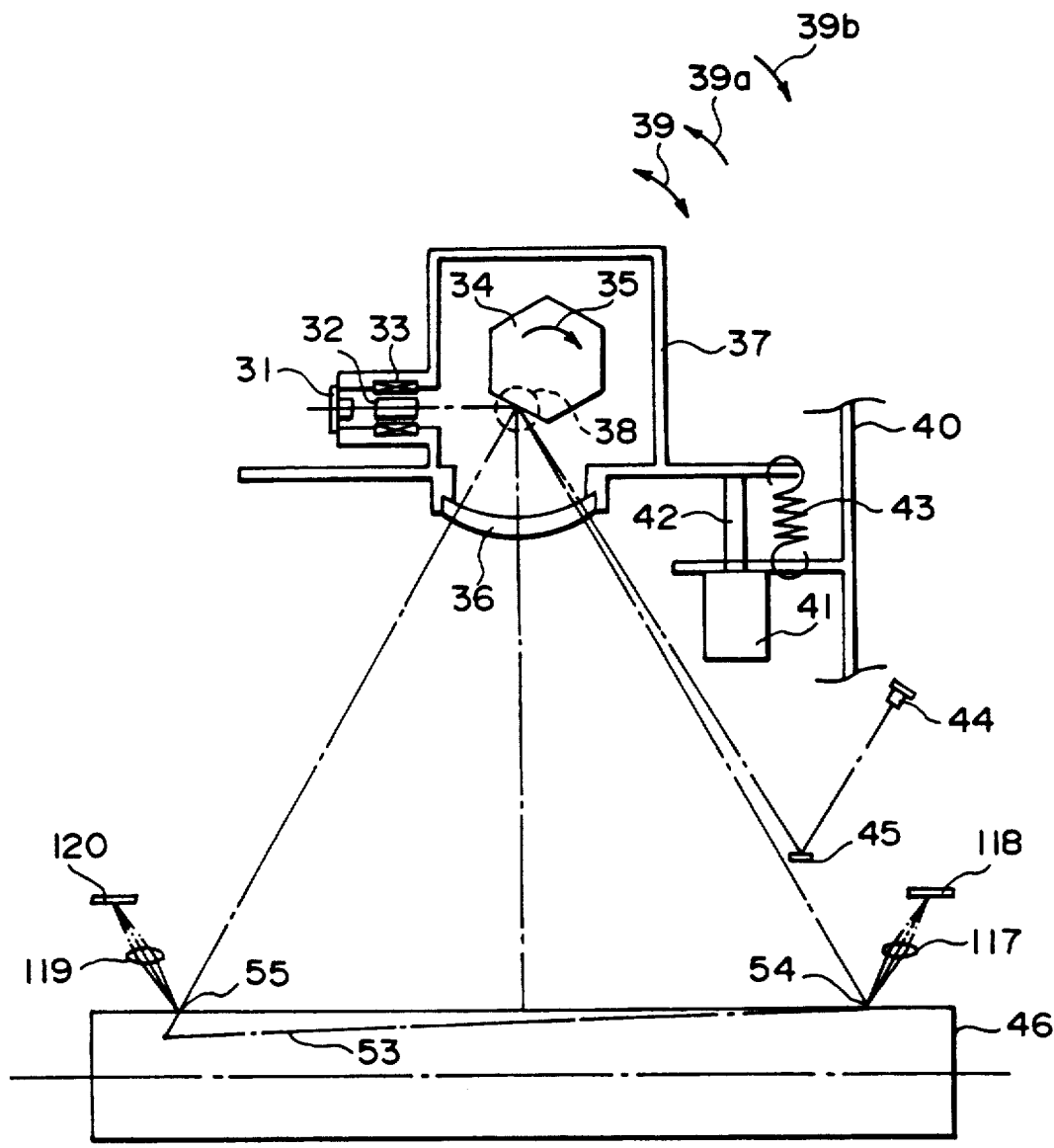
FIG. 12 is the drawing to explain another example of embodiment of the scanning optical equipment of the present invention.

In the aforesaid example of embodiment, only one image forming device is employed to execute detection at plural number of points but as illustrated in FIG. 12, plural image forming devices may be provided in accordance with to the number of detecting points.

In FIG. 12, 117 is the image forming lens to form the image of the light coming from the starting end 54 on the image forming device 118, while 119 is the image forming lens to form the image of the light coming from the funishing end 55 on the image forming device 120. In the example of embodiment shown in FIG. 12, plural image forming devices are provided and consequently, its composition is more complicated than that of the example of embodiment shown in FIG. 4 but on the other hand, it requires no mirrors 48, 52 etc.

Other features and performances are essentially same with those of the example of embodiment shown in FIG. 4.

Likewise, the embodiment shown in FIG. 10 may be so constructed that plural image forming devices are provided corresponding to each observation point.

In the aforesaid embodiments, the adjustment of the state of focusing of spot by the performance of detecting mechanism may be made intermittently at appropriate intervals or may be made when the increase of temperature beyond certain level is detected by providing temperature sensor, etc.

The method to exercise the control of good image plane, focusing and curvature of field etc. based on the results of detection of the detecting mechanism explained above is only one example and other publicly known method may be used.

As explained above, the present invention relates to the scanning optical equipment to scan the irradiated member by the light beam coming from the light source which is characterized by being provided with the detecting means to observe and detect the state of focusing of the spot of scanning light beam on the irradiated member at least at two points.

The aforesaid detecting means may be one or in plural number according to the number of observation points.

With the aforesaid equipment, the focusing of the spot of the scanning beam is controlled based on the output of the aforesaid detecting means.

With the aforesaid equipment, the posture of good image plane of the scanning beam as against the plane of irradiated member is controlled based on the output of the said detecting means.

With the aforesaid equipment, if the observation is made at least at 3 points, the curvature of field on the irradiated member and distortion can be corrected based on the output of the detecting means.

According to the aforesaid composition of the present invention, the state of the spot on the irradiated member such as photosensitive member is observed at more than 2 points, the inclination of the image plane, focussing etc. are accurately corrected and thus the good image plane is made to accurately agree with the plane of irradiated member. Thus it becomes possible to form a high density image which can not be achieved by the conventional methods.

The composition of the scanning optical equipment of the present invention as explained above may be summarized as follows:

Scanning optical equipment of the present invention has the composition comprises;

a light source section, optical means to focus the light beam coming from the light source section on the photosensitive member, deflecting means to deflect the light beam coming from the light source section, detecting means to detect the light beam deflected by the deflecting means and coming via the photosensitive member and control means to control the focusing position of the light beam by the aforesaid optical means according to the signal coming from the detecting means.

The scanning optical equipment of the present invention has the composition which comprises;

a light source section, a photosensitive member, optical means to focus the light beam coming from the aforesaid light source section on the photosensitive member, deflecting means to deflect the light beam coming from the light source section, detecting means to detect the light beam deflected by the deflecting means and coming via the photosensitive member and control means to control the focusing position of the light beam by the optical means according to the signal coming from the detecting means.

The scanning optical equipment of the present invention has the composition which comprises;

a light source section, optical means to focus the light beam coming from the light source section on the specified plane, deflecting means to deflect the light beam coming from the light source section, detecting means to detect the light beam deflected by the deflecting means coming via the region outside the region of use of the specified plane and the control means to control the focusing position of the light beam by the optical means according to the signal coming from the detecting means.

The scanning optical equipment of the present invention has the composition which comprises;

a light source section, optical means to focus the light beam coming from the light source section, deflecting means to deflect the light beam coming from the light source section, light receiving means to receive the light beam deflected by the deflecting means, detecting means to detect the light beam deflected by the deflecting means and coming via the region outside the region of use of the light receiving means and control means to control the focusing position of the light beam by the optical means according to the signal coming from the detecting means.

The scanning optical equipment of the present invention has the composition which comprises;

a light source section, optical means to focus the light beam coming from the light source section on the photosensitive member, deflecting means to deflect the light beam coming from the light source section, detecting means to detect the light beam deflected by the deflecting means and coming via the first position of the photosensitive member and the light beam deflected by the deflecting means and coming via the second position which is different from the first position of the photosensitive member and control means to control the focusing position of the light beam focused by the optical means according to the signal coming from the detecting means.

The scanning optical equipment of the present invention has the composition which comprises;

a light source section, a photosensitive member, optical means to focus the light beam coming from the light source section of the photosensitive member, deflecting means to deflect the light beam coming from the light source section, detecting means to detect the light bean. deflected by the deflecting means and coming via the first position of the photosensitive member and the light beam deflected by the deflecting means and coming via the second position which is different from the first position of the photosensitive member and control means to control the focusing position of the light beam by the optical means according to the signal coming from the detecting means.

The scanning optical equipment of the aforesaid composition is provided with the spot detecting means to observe the spot of the scanning light formed on the irradiated member such as photosensitive member itself and therefore the state of focusing of the spot on the irradiated member is detected directly and with certainly and therefore the state of focusing is very accurately controlled.

We claim:

1. Scanning optical equipment comprising:

a source for a light beam;

optical means to focus the light beam on a photosensitive member;

deflecting means to deflect the light beam;

detecting means to detect the light beam deflected by said deflecting means, coming via said photosensitive member, and not returning to said deflecting means; and control means to control the focus of the light beam by said optical means according to a signal received from said detecting means.

2. Scanning optical equipment according to claim 1, wherein said control means controls the focus of the light beam by said optical means in response to a change of the time of generation of the signal from said detecting means.

3. Laser beam printer comprising:

a source for a light beam;
a photosensitive member;
optical means to focus the light beam on said photosensitive member;
deflecting means to deflect the light beam;
detecting means to detect the light beam deflected by said deflecting means, coming via said photosensitive member, and not returning to said deflecting means; and
control means to control the focus of the light beam by said optical means according to a signal received from said detecting means.

4. Laser beam printer according to claim 3, wherein said control means controls the focus of the light beam by said optical means in response to a change of the time of generation of the signal from said detecting means.

5. Scanning optical equipment comprising:
a source for a light beam;
optical means to focus the light beam on a photosensitive member;
deflecting means to deflect the light beam;
detecting means to detect the light beam deflected by said deflecting means, coming via a non-image region of the photosensitive member, and not returning to said deflecting means; and
control means to control the focus of the light beam by said optical means according to a signal received from said detecting means.

6. Scanning optical equipment comprising:
a source for a light beam;
optical means to focus the light beam;
deflecting means to deflect the light beam;
a photosensitive member to receive the light beam deflected by said deflecting means;
detecting means to detect the light beam deflected by said deflecting means, coming via a non-image region of the photosensitive member, and not returning to said deflecting means; and
control means to control the focus of the light beam by said optical means according to a signal received from said detecting means.

7. Scanning optical equipment comprising:
a source for a light beam;
optical means to focus the light beam on a photosensitive member;
deflecting means to deflect the light beam;
detecting means to detect the light beam deflected by said deflecting means and coming via a first position on said photosensitive member and the light beam deflected by said deflecting means and coming via a second position which is different from the first position on the photosensitive member; and
control means to control the focus of the light beam by said optical means according to a signal received from said detecting means.

8. Laser beam printer comprising:
a source for a light beam;
a photosensitive member;
optical means to focus the light beam;
deflecting means to deflect the light beam;
detecting means to detect the light beam deflected by said deflecting means and coming via a first position on said photosensitive member and the light beam deflected by said deflecting means coming via a second position which is different from the first position on said photosensitive member; and
control means to control the focus of the light beam by said optical means according to a signal received from said detecting means.

9. Scanning optical equipment according to any of claims 1, 3, 5, 6, 7, 8, wherein said optical means includes a movable collimator for collimating the light beam, and wherein said control means controls the focus through movement of the collimator.

10. Scanning optical equipment according to claim 7 or 8, further comprising means for pivoting said deflecting means, wherein said control means controls the focus through pivot of said pivoting means.

11. Scanning optical equipment comprising:
a source for a light beam;
optical means for deflecting and focusing the light beam to a predetermined plane;
detecting means for detecting variation of the state of the light beam between a region of use of said predetermined plane and a region outside the region of use of said predetermined plane; and
control means for controlling focus of the light beam according to a signal from said detecting means.

12. Scanning optical equipment according to claim 11, wherein said detecting means detects variation of the light quantity of the light beam.

13. Scanning optical equipment comprising:
a source for a light beam;
optical means for deflecting and focusing the light beam to a photosensitive member;
detecting means for detecting a light beam deflected to said photosensitive member and not returning to said r ns for deflecting; and
control means for controlling focus of the light beam according to a signal from said detecting means.

14. Laser beam printer comprising:
a source for a light beam;
a photosensitive member;
optical means for deflecting and focusing the light beam to said photosensitive member;
detecting means for detecting a light beam deflected to said photosensitive member and not returning to said means for deflecting; and
control means for controlling focus of the light beam according to a signal from said detecting means.

15. Scanning optical equipment comprising:
a source for a light beam;
optical means for deflecting and focusing the light beam to a photosensitive plane;
first detecting means for detecting the light beam at a first position on said predetermined plane;
second detecting means for detecting the light beam at a second position different from the first position on said predetermined plane; and
control means for controlling focus of the light beam according to a signal from said first detecting means and a signal from said second detecting means.

16. Laser beam printer comprising:
a source for a light beam;
a photosensitive member, at least a portion of which is positioned on a predetermined plane;
optical means for deflecting and focusing the light beam to said photosensitive member and the predetermined plane;
first detecting means for detecting the light beam at a first position on said predetermined plane;

second detecting means for detecting the light beam at a second position different from the first position on said predetermined plane; and control means for controlling focus of the light beam according to a signal from said first detecting means and a signal from said second detecting means.

17. Scanning optical equipment comprising:

a source for a light beam;

optical means for deflecting the light beam to a predetermined plane;

a frame for accommodating said source and said optical means;

first detecting means for detecting the light beam at a first position on said predetermined plane;

second detecting means for detecting the light beam at a second position different from the first position on said predetermined plane; and control means for controlling a position of said frame according to a signal from said first detecting means and a signal from said second detecting means.

18. Laser beam printer comprising:

a source for a light beam;

a photosensitive member, at least a portion of which is positioned on a predetermined plane;

optical means for deflecting the light beam to said photosensitive member and the predetermined plane;

a frame for accommodating said source and said optical means;

first detecting means for detecting the light beam at a first position on said predetermined plane;

second detecting means for detecting the light beam at a second position different from the first position on said predetermined plane; and control means for controlling a position of said frame according to a signal from said first detecting means and a signal from said second detecting means.

19. Scanning optical equipment comprising:

a source for a light beam;

optical means for deflecting and focusing the light beam to a predetermined plane;

detecting means for detecting the light beam at at least two positions on said predetermined plane; and control means for controlling focus of the light beam according to a signal from said detecting means.

20. Laser beam printer comprising:

a source for a light beam;

a photosensitive member;

optical means for deflecting and focusing the light beam to said photosensitive member;

detecting means for detecting a focus state of the light beam on said photosensitive member at at least two points; and control means for controlling focus of the light beam according to a signal from said detecting means.

21. A method for adjusting a light beam in a laser beam printer comprising the steps of:

guiding and focusing a light beam deflected by deflecting means to a photosensitive member; detecting the light beam coming via the photosensitive member and not returning to the deflecting means; and controlling focus of the light beam on the basis of the detection in said detecting step.

22. A method for adjusting a light beam in a laser beam printer comprising the steps of:

guiding and focusing a light beam deflected by deflecting means to a photosensitive member;

detecting a light beam coming via a non-image region of the photosensitive member and not returning to the deflecting means; and controlling focus of the light beam on the basis of the detection in said detecting step.

23. A method for adjusting a light beam in a laser beam printer comprising the steps of:

guiding and focusing a light beam deflected by deflecting means to a photosensitive member;

detecting the light beam coming via the photosensitive member and not returning to the deflecting means; and controlling focus of the light beam on the basis of the detection in said detecting step.

24. A method for adjusting a light beam in a scanning optical equipment comprising the steps of:

guiding and focusing a deflected light beam to a predetermined plane;

detecting the light beam at a first position and a second position different from the first position on the predetermined plane; and controlling focus of the light beam on the basis of the detection in said detecting step.

25. A method for adjusting a light beam in a scanning optical equipment comprising the steps of:

guiding a light beam deflected by a deflector to a predetermined plane;

detecting the light beam at a first position and a second position different from the first position on the predetermined plane; and controlling a position of a frame having at least the deflector accommodated thereon on the basis of the detection in said detection step.

26. A method for adjusting a light beam in a laser beam printer comprising the steps of:

guiding and focusing a deflected light beam to a photosensitive member;

detecting a focus state of the light beam on the photosensitive member at at least two points; and controlling focus of the light beam on the basis of the detection in said detecting step.

* * * * *

UNITED STATES PATENT AND TRADEMARK OFFICE
CERTIFICATE OF CORRECTION

PATENT NO. : 5,283,681

DATED : February 1, 1994

INVENTOR(S) : Osamu Hoshino, et al.

It is certified that error appears in the above-indentified patent and that said Letters Patent is hereby corrected as shown below:

Column 12, line 49, change "photosensitive" to --predetermined--.

Column 14, line 48, change "detection" to --detecting--.

Signed and Sealed this

Fourth Day of October, 1994

Attest:

BRUCE LEHMAN

Attesting Officer

Commissioner of Patents and Trademarks